United States Patent [19]

Persson

[11] 4,165,085
[45] Aug. 21, 1979

[54] FOAMED PLASTIC LUBRICATING SEAL
[75] Inventor: Stig Persson, Katrineholm, Sweden
[73] Assignee: SKF Industries, Inc., King of Prussia, Pa.
[21] Appl. No.: 832,458
[22] Filed: Sep. 12, 1977
[30] Foreign Application Priority Data
Oct. 18, 1976 [SE] Sweden .............................. 7611517
[51] Int. Cl.² ........................ F16J 15/20; F16J 15/32
[52] U.S. Cl. ............................. 277/228; 277/DIG. 6; 277/96.2; 277/152; 277/165; 277/233; 308/240
[58] Field of Search ................. 308/DIG. 5, DIG. 9, 308/240, 243; 277/DIG. 6, 96.2, 138, 227, 228, 233, 207 A, 152, 153, 165, 177

[56] References Cited
U.S. PATENT DOCUMENTS

| | | |
|---|---|---|
| 1,362,571 | 12/1920 | Jones ................................ 308/240 X |
| 2,752,181 | 6/1956 | Safford ................................ 277/228 |
| 2,951,721 | 9/1960 | Asp ........................................ 277/233 |
| 2,998,397 | 8/1961 | Riesing ....................... 277/DIG. 6 X |
| 3,220,786 | 11/1965 | McCutchen .......................... 308/240 |
| 3,380,843 | 4/1968 | Davis ................................ 308/240 X |
| 3,741,570 | 6/1973 | Jarrett ......................... 277/207 A X |
| 3,938,868 | 2/1976 | Van Wyk ...................... 308/240 X |

Primary Examiner—Robert S. Ward, Jr.
Attorney, Agent, or Firm—Eugene E. Renz, Jr.

[57] ABSTRACT

A seal for a gap between at least two surfaces comprising a unitary body member made of a foam plastic material including at least one homogeneous peripheral surface portion and at least one internal porous portion. The porous portion is filled with a lubricant and is exposed through at least one section in the homogeneous peripheral surface portion to permit transfer of lubricant therethrough.

11 Claims, 13 Drawing Figures

FOAMED PLASTIC LUBRICATING SEAL

BACKGROUND OF THE INVENTION

The present invention refers to a seal for a gap between two surfaces. The seal is primarily intended to be used in a gap between two surfaces which are movable relative each other, but it can also be used as a seal between two surfaces, which are not movable relative each other.

A seal's fitness for use is depending i.a. upon its ability to prevent different objects from passing it, upon its mechanical strength, and—in cases where a gap between two relatively movable surfaces is to be sealed off—upon its friction properties. In order to obtain good properties in all these respects is it generally necessary that the seal is manufactured from a plurality of different materials or that it consists of several parts. This will make the manufacture more expensive and the handling more difficult.

The purpose of the present invention is to provide a seal comprising one single part, which can be easily and cheaply manufactured from a single initial material and which has good sealing, strength and friction properties.

This is achieved in accordance with the invention by giving the seal the features defined in the claims attached hereto.

A seal in accordance with the invention can easily be manufactured in different geometrical shapes and with different mechanical properties, for making it adapted to different fields of applications.

SUMMARY OF THE INVENTION

The above objectives are attained by a seal made in accordance with the present invention which comprises a seal body made of a foamed plastic material and includes at least one homogeneous peripheral surface portion and at least one porous portion. The porous portion has at least one section exposed through the peripheral surface portion. The porous portion of the seal is filled with a lubricant which is transferred through the seal to the exposed section thereof which is opposite and movable in relation to one of the surfaces which constitutes the gap of two relatively movable surfaces to be sealed.

BRIEF DESCRIPTION OF THE DRAWINGS

The invention will hereinafter be further described with reference to the accompanying drawings, FIG. 1 of which shows an embodiment of a radial seal for a gap between a shaft and a bore of a bearing housing.

DESCRIPTION OF THE EMBODIMENTS OF THE INVENTION

Figures 1, 2, 3, 3A:
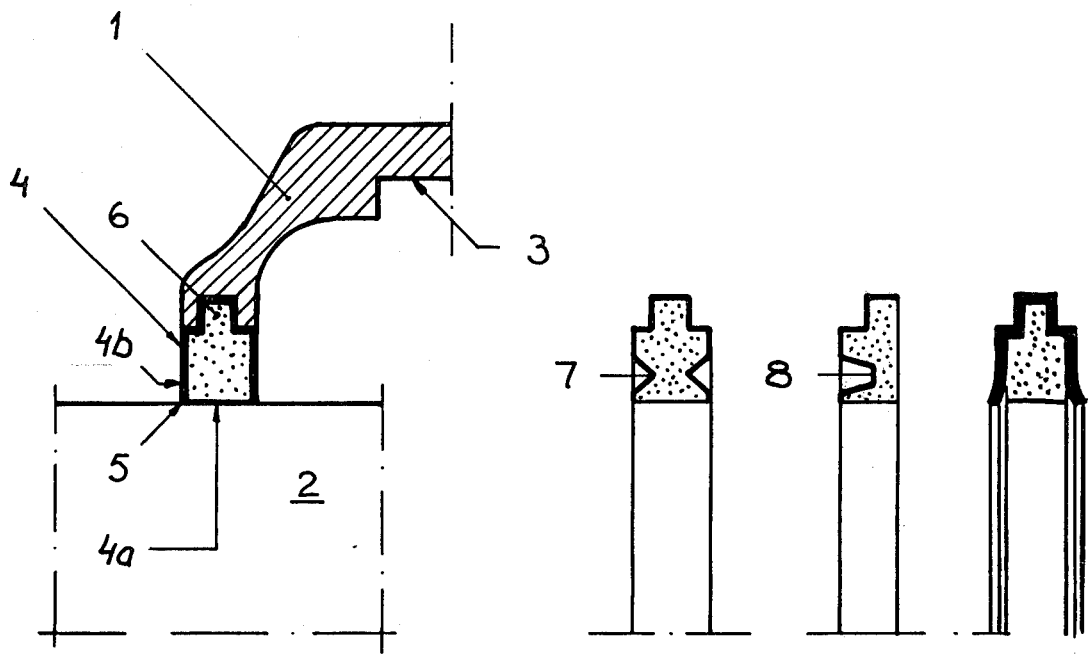
FIGS. 2, 3, 3a and 4a show other embodiments of the seal for said purpose.

In FIG. 1 is shown an axial section of a part of a bearing housing 1 and a through-shaft 2. The bearing seat of the bearing housing is marked 3. The space between the envelope surface of the shaft 2 and a through-opening in the housing intended for the shaft is sealed off with an annular seal 4. The seal is made from so called integral foam plastic, i.e., a foamed plastic having a hard and homogeneous surface layer of desired thickness disposed around the porous material. By for instance cutting parts of integral foam plastic objects, parts are obtained having on one hand surface portions of porous material and on the other hand surface portions of hard material. A seal in accordance with FIG. 1 may preferably be made by cutting pieces from annular blanks of integral foam plastic and the seal has at least one surface section of porous material and at least one surface section of hard material, a surface section 4a of porous material thereby preferably contacting one of the surfaces defining said space or gap—said surface in the embodiment shown in FIG. 1 being the envelope surface of the shaft—and one surace section 4b of hard material being disposed to cover at least a part of said gap. The seal as shown in FIG. 1 has a surface section of hard material which bridges the gap entirely, whereby the edge 5 of the hard material engages the shaft.

The portion of the seal which contacts the bore wall of the bearing housing 1 is preferably a hard material surface in order to make possible a stable fitting of the seal, and the bore wall has a groove, in which a portion 6 of the seal is inserted for securing it in position.

In an embodiment in accordance with FIG. 1, wherein the seal engages a movable surface, the porous portion preferably is filled with a lubricant, e.g. oil, which will improve the friction and sealing properties of the seal.

FIGS. 2 and 3 show axial sections of further embodiments of seals suitable for use in a housing as shown in FIG. 1. In the embodiment shown in FIG. 2 only the surface of the bore wall is of porous material, whereas in the embodiment according to FIG. 3 there is as well a side wall consisting of porous material. Seals of the type shown in FIG. 3 can be made by cutting a seal blank essentially as shown in FIG. 2 in two parts along a radial plane. In order to obtain good elastic properties in radial direction the hard seal surface layer covering the space to be sealed is provided with a fold 7, 8.

FIG. 3a shows a seal which at each side adjacent the sealing surface has a slotted groove disposed between the hard material and the porous material. This embodiment gives the sealing surface improved sealing properties.

Figure 4:
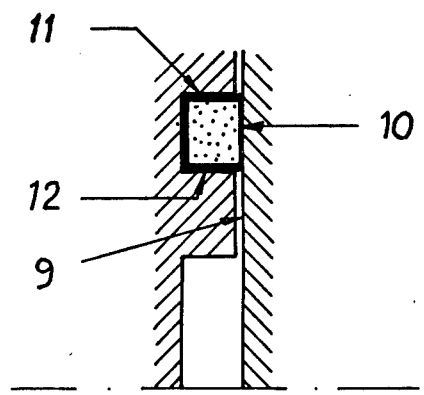
FIG. 4 shows an axial seal.

In FIG. 4 is shown an axial section of an axial seal embodiment intended to engage against a radial plane 9. One side surface 10 of the seal is a porous surface for engaging said plane. In order to obtain good elastic properties in axial direction, the axial portions 11, 12 of hard material may be provided with folds.

Figure 4A:
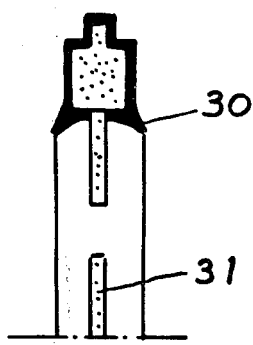

FIG. 4a shows a seal intended for an assembly such as that shown in FIG. 1. The porous material is here enclosed in a hard material except for at a number of slots or openings 3 around the inner seal periphery and a sealing lip 30 of hard material is furthermore arranged at each side of the seal. The space between the sealing lips communicates via the slots or apertures with the porous material, which is preferably filled with a lubricant, which thus can enter into said space through the slots or apertures.

Figures 5, 6, 7, 8:
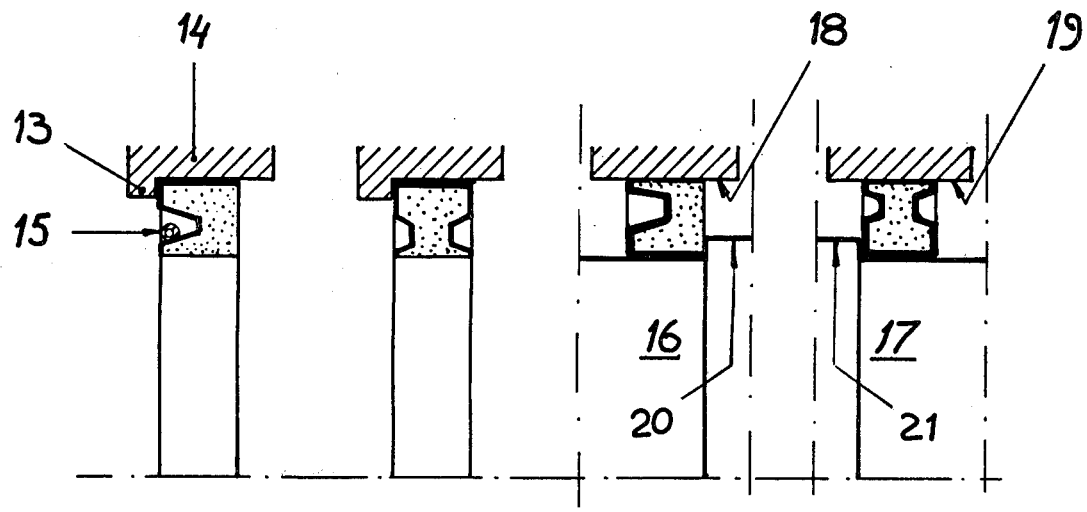
FIGS. 5, 6, 7 and 8 show different radial seal embodiments

FIG. 5 shows an axial section through a radial seal intended to be mounted against a collar 13 in a housing 14. In order to bring about an improved contact against for instance a shaft, which is enclosed by the seal an elastic ring 15, e.g. a helical spring is inserted in the fold in one of the side surfaces of the seal for generating a radially compressing force on the seal.

FIG. 6 shows an axial section of another embodiment of a seal for an assembly corresponding to that shown in FIG. 5. Both side surfaces of the seal are here provided with portions of a hard material in order to bring about a good mechanical resistance.

FIGS. 7 and 8 show axial sections through two embodiments of the seal intended to be mounted on a shaft 16, 17 or the like and for engaging an enclosing cavity wall 18, 19. The shaft is thereby provided with a collar 20, 21 for settling of the position of the seal.

Figures 9, 10, 11:
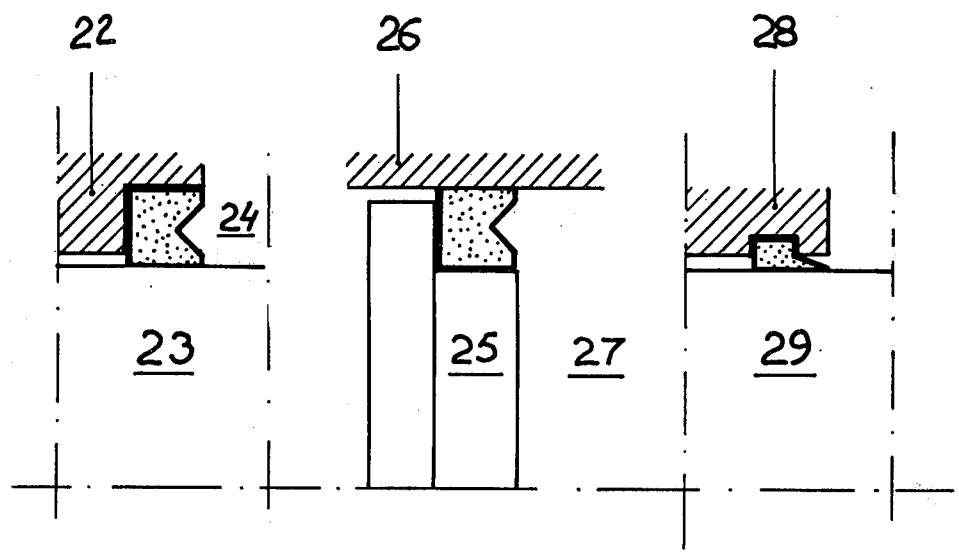
FIGS. 9, 10 and 11 show different embodiments of piston seals and piston rod seals.

FIG. 9 shows an axial section of a seal for the gap between a member 22 provided with a through hole and a central cylindrical member 23, which is detachable relative to the member 22. The seal is intended to seal off a pressure medium contained in a space 24.

FIG. 10 shows an axial section through a seal for a piston 25, which is displaceable in a central bore in a cylinder 26 and which is intended to generate a pressure on a medium contained in a space 27.

FIG. 11 shows a wiper device arranged in an opening in a housing 28, which wiper device engages a piston 29 displaceable through the opening.

The embodiments hereabove described are only examples of different seals according to the invention. It is evident that also seals of other shapes are possible within the scope of the appended claims. A seal for a gap between two surfaces, which are immobile relative to each other is for example possible and in such case it may be suitable that both surfaces are engaged by seal surface sections of porous material. Such a seal does not have to be annular of course. It is also possible to arrange for continuous supply of lubricant to the porous part of the seal if necessary, e.g. through apertures in the hard surface of the seal. A seal according to FIG. 3 can of course be made without folds 8 (compare the embodiment shown in FIG. 1). Axial seals can in principle be made in accordance with a seal according to FIGS. 3a and 4a. If extra rigidity is desired it is for instance possible to embed a metallic sheet in the sealing material in any suitable position.

I claim:

1. A unitary, one piece seal for a gap between at least two surfaces comprising a single, one piece body member made of a foamed plastic material consisting of at least one homogeneous liquid impermeable hard and rigid peripheral surface portion and at least one porous portion of the same material, said porous portion filled with a lubricant, said porous portion being exposed through at least one section in said homogeneous peripheral surface portion to permit transfer of lubricant therethrough.

2. A seal as claimed in claim 1 wherein said body member is annular and includes a pair of circumferentially extending angularly disposed sealing lips projecting from opposite axial ends of the inner peripheral surface of said body member.

3. A seal as claimed in claim 2 wherein the inner peripheral surface is provided with a series of circumferentially spaced slots in said homogeneous peripheral surface portion arranged between said sealing lips to expose through said slots, said porous body portion.

4. A combination comprising at least a pair of members having spaced apart surfaces defining a gap therebetween, a unitary one piece seal for sealing the gap comprising a single, one piece body member made of a foamed plastic material consisting of at least one homogeneous liquid impermeable and rigid peripheral surface portion and at least one porous portion of the same material, said porous portion filled with a lubricant, said porous portion being exposed through at least one section in said homogeneous peripheral surface portion to permit transfer of lubricant therethrough.

5. A seal according to claim 4 wherein the porous portion engages against one of the surfaces of said members defining said gap and said peripheral surface portion engages and covers at least part of said gap between said surfaces to be sealed.

6. A seal according to claim 5 wherein one of said surfaces is provided with means determining the position of the seal body and said homogeneous peripheral surface portion of said seal body engages therewith.

7. A seal according to claim 6 wherein said positioning determining means comprises a groove in one of said surfaces.

8. A seal according to claim 6 wherein said positioning determining means comprises a collar in one of said surfaces.

9. A seal according to claim 4 wherein said seal body is an annular member and wherein the homogeneous peripheral surface portion defining the axial end faces of said seal body is provided with peripherally extending gaps or folds.

10. A seal according to claim 8 wherein one of said members comprises a shaft and the other member comprises a housing enclosing said shaft and wherein said seal body is an annular member engaged between said housing and shaft, means defining circumferentially extending recesses in the axial end faces of said body portion and including an elastic ring engaging in at least one of said recesses.

11. A seal according to claim 4 wherein said homogeneous surface portion engages against one of said surfaces and includes a plurality of slots therein to expose said porous portion and permit engagement with said one surface.

* * * * *